(12) United States Patent
Vidalenc et al.

(10) Patent No.: US 10,711,792 B2
(45) Date of Patent: Jul. 14, 2020

(54) AUXILIARY TURBOMACHINERY SHAFT SUPPORT SYSTEM AND TURBOMACHINERY COMPRISING SAID SYSTEM

(71) Applicant: THERMODYN SAS, Le Creusot (FR)

(72) Inventors: Yoann Vidalenc, Le Creusot (FR); Thomas Alban, Le Creusot (FR)

(73) Assignee: THERMODYN SAS, Le Creusot (FR)

( * ) Notice: Subject to any disclaimer, the term of this patent is extended or adjusted under 35 U.S.C. 154(b) by 0 days.

(21) Appl. No.: 15/762,951

(22) PCT Filed: Sep. 28, 2016

(86) PCT No.: PCT/EP2016/073150
§ 371 (c)(1),
(2) Date: Mar. 23, 2018

(87) PCT Pub. No.: WO2017/055371
PCT Pub. Date: Apr. 6, 2017

(65) Prior Publication Data
US 2018/0274548 A1 Sep. 27, 2018

(30) Foreign Application Priority Data
Oct. 1, 2015 (IT) .......................... 102015000057392

(51) Int. Cl.
*F04D 29/05* (2006.01)
*F16C 17/04* (2006.01)
(Continued)

(52) U.S. Cl.
CPC .......... *F04D 29/051* (2013.01); *F01D 25/168* (2013.01); *F04D 27/001* (2013.01);
(Continued)

(58) Field of Classification Search
CPC .......... E21B 4/003; E21B 10/22; E21B 10/23; F01D 25/168; F16C 2352/00; F16C 27/02;
(Continued)

(56) References Cited

U.S. PATENT DOCUMENTS

| 4,403,873 A | 9/1983 | Gardner |
| 4,468,138 A | 8/1984 | Nagel |

(Continued)

FOREIGN PATENT DOCUMENTS

| EP | 0 980 478 A1 | 2/2000 |
| GB | 2 273 746 A | 6/1994 |
| WO | 2011/011573 A1 | 1/2011 |

OTHER PUBLICATIONS

Italian Search Report and Written Opinion issued in connection with corresponding IT Application No. 102015000057392 dated Jun. 9, 2016.

(Continued)

*Primary Examiner* — Alan B Waits
(74) *Attorney, Agent, or Firm* — Baker Hughes Patent Organization

(57) ABSTRACT

An auxiliary turbomachinery shaft-support system including a first assembly configured to axially support the shaft, the first assembly including a rotating disc having a part shaped to be torsionally coupled to the shaft, and a stator including at least one pad including at least one elastic component coupled with the pads and urging it in the direction of a disc sliding surface.

17 Claims, 2 Drawing Sheets

(51) Int. Cl.
| | |
|---|---|
| *F16C 33/04* | (2006.01) |
| *F04D 29/051* | (2006.01) |
| *F16C 23/02* | (2006.01) |
| *F16C 27/08* | (2006.01) |
| *F16C 32/04* | (2006.01) |
| *F16C 33/26* | (2006.01) |
| *F16C 39/02* | (2006.01) |
| *F01D 25/16* | (2006.01) |
| *F04D 27/00* | (2006.01) |
| *F04D 29/02* | (2006.01) |
| *F04D 29/058* | (2006.01) |

(52) U.S. Cl.
CPC ....... *F04D 29/023* (2013.01); *F04D 29/0513* (2013.01); *F16C 17/04* (2013.01); *F16C 23/02* (2013.01); *F16C 27/08* (2013.01); *F16C 32/0442* (2013.01); *F16C 33/043* (2013.01); *F16C 33/26* (2013.01); *F16C 39/02* (2013.01); *F04D 29/058* (2013.01); *F16C 2360/44* (2013.01)

(58) Field of Classification Search
CPC .......... F16C 27/08; F16C 17/04; F16C 17/06; F16C 23/02; F16C 32/0442; F16C 39/02; F16C 2360/44; F16C 33/043; F16C 33/26; F04D 29/058; F04D 29/04; F04D 29/041; F04D 29/0413; F04D 29/046; F04D 29/049
See application file for complete search history.

(56) References Cited

U.S. PATENT DOCUMENTS

| | | | | |
|---|---|---|---|---|
| 4,544,285 A | * | 10/1985 | Shapiro | B63H 23/321 384/306 |
| 4,560,014 A | | 12/1985 | Geczy | |
| 5,092,687 A | | 3/1992 | Hall | |
| 5,702,769 A | * | 12/1997 | Peters | C23C 4/04 427/450 |
| 6,290,008 B1 | * | 9/2001 | Portwood | E21B 10/52 175/420.1 |
| 7,144,226 B2 | * | 12/2006 | Pugnet | F04D 17/125 417/244 |
| 8,011,307 B2 | * | 9/2011 | Marcelli | B65G 39/025 108/55.3 |
| 8,545,104 B2 | | 10/2013 | Cooley et al. | |
| 8,616,304 B2 | * | 12/2013 | Scott | E21B 4/003 175/107 |
| 2005/0077042 A1 | * | 4/2005 | Ravensbergen | E21B 41/0078 166/242.4 |
| 2006/0171617 A1 | * | 8/2006 | Cross | F16C 17/06 384/122 |
| 2006/0278439 A1 | * | 12/2006 | Ide | E21B 4/003 175/107 |
| 2009/0252595 A1 | * | 10/2009 | Cross | F01D 25/166 415/111 |
| 2009/0268995 A1 | * | 10/2009 | Ide | E21B 4/003 384/121 |
| 2010/0212964 A1 | * | 8/2010 | Beuershausen | E21B 10/62 175/57 |
| 2011/0174547 A1 | * | 7/2011 | Sexton | F16C 33/043 175/371 |
| 2012/0164005 A1 | * | 6/2012 | Alban | F04D 29/054 417/348 |
| 2014/0341487 A1 | | 11/2014 | Cooley et al. | |
| 2015/0184540 A1 | | 7/2015 | Winkler et al. | |
| 2018/0355880 A1 | * | 12/2018 | Urushidani | F16J 15/447 |
| 2019/0040691 A1 | * | 2/2019 | Mayer | E21B 12/00 |
| 2019/0063257 A1 | * | 2/2019 | Fioravanti | F16C 32/044 |
| 2019/0078465 A1 | * | 3/2019 | Choi | F01D 25/162 |

OTHER PUBLICATIONS

International Search Report and Written Opinion issued in connection with corresponding PCT Application No. PCT/EP2016/073150 dated Jan. 24, 2017.

International Preliminary Report on Patentability issued in connection with corresponding PCT Application No. PCT/EP2016/073150 dated Apr. 3, 2018.

* cited by examiner

AUXILIARY TURBOMACHINERY SHAFT SUPPORT SYSTEM AND TURBOMACHINERY COMPRISING SAID SYSTEM

FIELD OF INVENTION

Embodiments of the subject matter disclosed herein correspond to an auxiliary turbomachinery shaft support system and to a turbomachinery comprising said system.

BACKGROUND OF THE INVENTION

Embodiments of the invention relate to an auxiliary turbomachinery shaft support system that may be applied to a centrifugal compressor. In particular, it relates to a shaft support system for turbomachinery of the type comprising magnetic bearings, which may be of the active type.

As known, turbomachinery may have a shaft, on which a plurality of devices may be mounted, for example turbines, centrifugal impellers, axial impellers etc. The shaft and the devices form a rotor assembly that is rotationally supported by bearings, which may be magnetic bearings.

As long as the magnetic bearings are operating correctly, they levitate the rotor and maintain the shaft in position by applying controlled electromagnetic forces on the rotor in radial and axial directions.

As known, magnetic bearings may be affected by malfunctioning, power loss or by temporary overloads that may lead to the loss of the shaft levitation.

To prevent an unwanted movement of the shaft and therefore damages deriving to those incidental circumstances, the shaft may have auxiliary support systems, also called landing systems, which may prevent damages to the turbomachinery.

Conventionally, this function of landing is provided by auxiliary angular contact ball bearings mounted on the shaft and designed to contain both the radial and axial forces induced by the incidental event.

The maximum number of landings that the angular contact ball bearings may support is mainly linked to the maximum axial force acting on the bearings.

In large turbomachinery, axial forces acting on the angular contact ball bearings are considerable and therefore their operating life is severely limited.

SUMMARY OF THE INVENTION

Therefore, there is a general need for an improved shaft support system.

An important idea is to provide an auxiliary shaft support system capable of supporting the shaft if magnetic bearing fails, that comprises a first assembly that may support the shaft axially and presents two discs, one coupled to the shaft and the other, coupled to the stator, comprising a plurality of pads pre-loaded by an elastic component in the direction of the disc coupled to the shaft.

Embodiments of the subject matter disclosed herein correspond to an auxiliary turbomachinery shaft support system.

Additional embodiments of the subject matter disclosed herein correspond to a turbomachinery comprising an auxiliary shaft support system.

BRIEF DESCRIPTION OF DRAWINGS

The accompanying drawings, which are incorporated herein and constitute a part of the specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit embodiments of the invention. Instead, the scope of embodiments of the invention is defined by the appended claims.

The following description relates to an auxiliary shaft support system that may support the shaft if magnetic bearing fails. A first assembly that may support the shaft axially comprises a disc and a stator. The stator comprises a plurality of pads pre-loaded by an elastic component in the direction of the disc coupled to the shaft. When the magnetic bearing fails, the disc comes into contact with the pads of the stator and the shaft movement may be axially limited.

Figure 1:
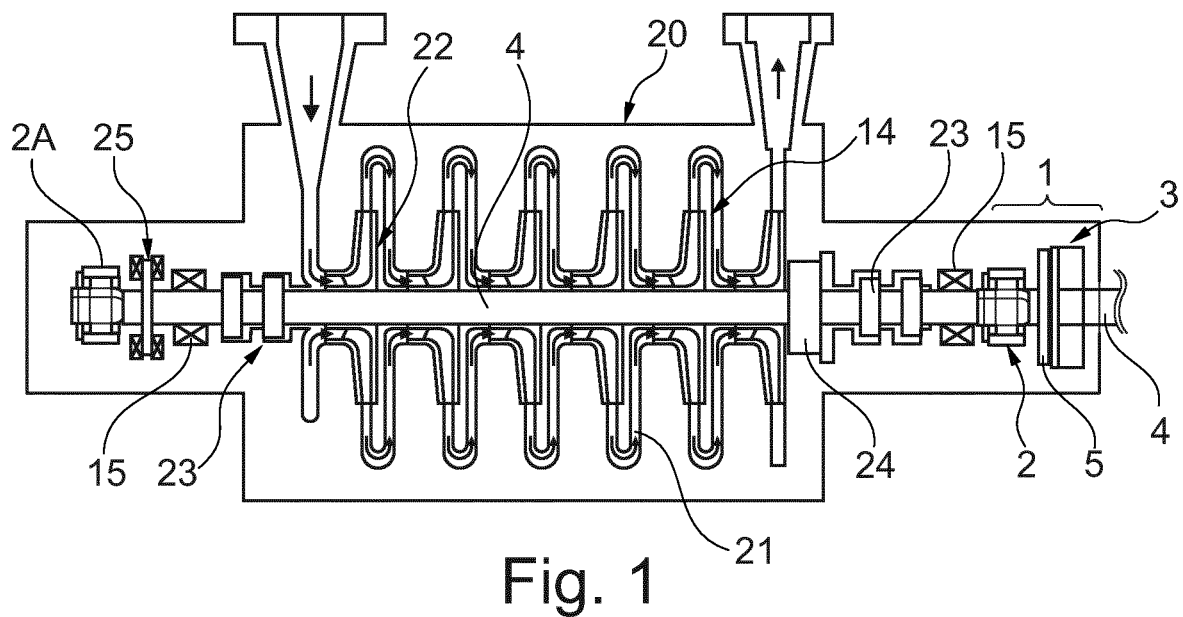
FIG. 1 shows a schematic and simplified cross section of a turbomachinery, which may be a centrifugal compressor, according to the present invention.

FIG. 1 shows a turbomachinery, in particular a centrifugal compressor, that comprises a turbomachinery stator 20 having stator return channels 21. The turbomachinery stator 20 rotationally supports a shaft 4 through magnetic bearings 15, 25 that may be of the active type.

On the shaft a plurality of compressor impellers 22 are mounted in order to form a rotor assembly 14. Seals 23 may be used to isolate the magnetic bearings from the process gas, especially if the process gas is not compliant with the magnetic bearings.

A balance drum 24 may be further included to compensate the thrust force on the shaft 4.

The turbomachinery may have an auxiliary shaft-support system, which may comprise bearings, and is overall indicated with reference number 1.

The auxiliary shaft-support system, also referred as landing system, is configured to support the rotor assembly in case of loss of levitation, e.g. if a malfunction of the magnetic bearings 15, 25 or an overload occurs. In the shown example, no braking function is provided by said system.

The auxiliary shaft-support system 1 comprises a first assembly 3 configured to axially support the shaft 4 and second assembly 2 configured to at least radially support it. The first and second systems may be mounted on the shaft 4.

The second assembly 2 may comprise ball bearings, more particularly, straight ball bearings.

The second assembly 2 may be located between the magnetic bearing 15, 25 and the first assembly 3, or it may be placed elsewhere on the shaft. Another ball bearing 2A, of the straight ball bearing type, may be located on the shaft 4 in order to support it at least radially.

The first assembly 3 comprises a rotating disc 5 having a part 5A shaped to be torsionally coupled to the shaft 4, for example by an interference coupling (shrinking) or by a key. The rotating disc 5 may have a disc sliding surface 5B that may be flat, or it may comprise a plurality of fixed pads made of a low-friction and wear resistant material like polycrystalline diamond, Carbon-Carbon Composite or the like.

Adjacent to the rotating disc 5 a stator 6 is positioned, comprising at least one pad 7, more particularly, at least two pads, circumferentially arranged on the stator 6 comprising at least one elastic component 8 pushing at least one pad 7 in the direction of the rotating disc sliding surface 5B. This allows the rotating disc 5 to rotationally slide on the stator 6 if an axial movement of the shaft 4 occurs. The disc/stator contact area have an axial stop function for the shaft and it is capable of supporting heavy loads (for example a thrust capacity of 50 kN), at high sliding speed (for example linear speeds of 150 m/s).

Figure 2:
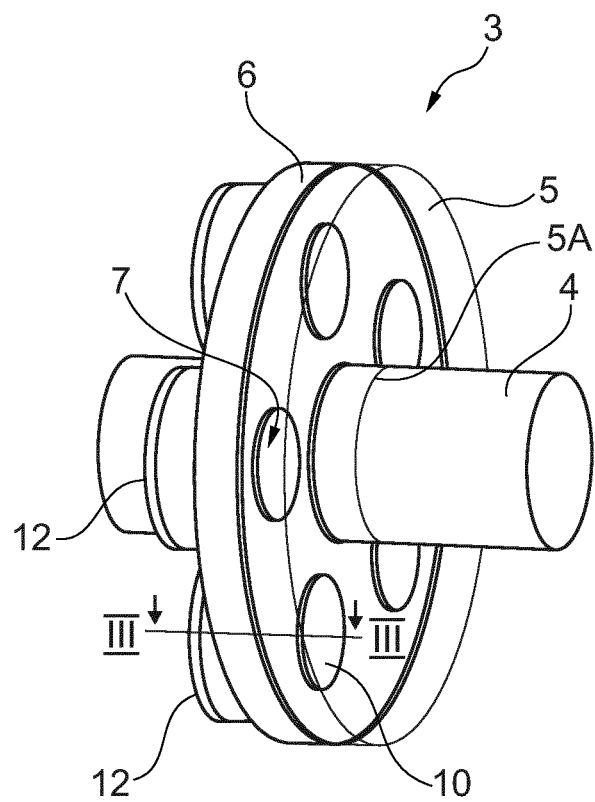
FIG. 2 shows a tree-dimensional simplified view of a part of the turbomachinery of FIG. 1.

As shown in FIG. 2, five pads may be present on the stator 6, and all of them may be identical. The pads 7 may have a pad sliding surface 10 that is circular. The pads 7 may be circumferentially arranged on the stator 6, around the shaft 4, so that the forces acting on them are perfectly balanced. Possible configurations may comprise pads 7 equally angularly distanced.

Of course, the stator may comprise a different number of pads 7, and the design of the pads supported by the stator may be slightly different. For example, the pads 7 may have a pad sliding surface 10 that may have an arc shape, annular shape, circular, sector-shape, rectangular or other appropriate shape.

In a possible configuration, fixed pads, that may be made of the same material of the pads 7, are used on the rotor disk 5, equally angularly distanced and disposed around shaft 4. These fixed pads could be positioned in a different configuration with respect to the pads 7 present on the stator. Their design, in any case, should allow a suitable covering of surfaces in sliding contact.

In the present description, it is assumed that all the pads 7 and their housings are identical. Therefore, only one of them will be described hereinafter.

Figure 3:
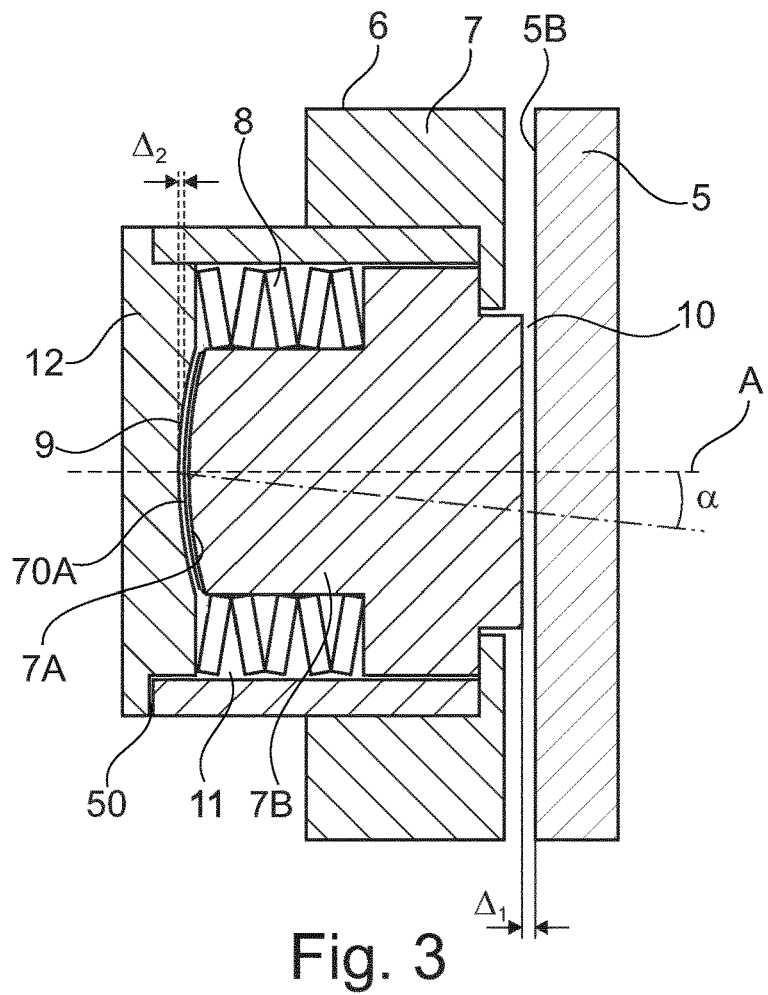
FIG. 3 shows a cross section taken along the line of FIG. 2.

With reference to FIG. 3 each pad 7 comprises a pad contact surface 7A that may cooperate with a stator contact surface 9. The pad contact surface may be placed on the rear part of the pad 7 that is opposite to the pad sliding surface 10.

The pad contact surface 7A and the stator contact surface 9 may have a shape that provides a pad 7 self-aligning function. The surface of mutual contact is designed to allow a movement of the axis A of the pads of an angle α that may be comprised between 0.01 and 1°, and in one embodiment 0.1°.

This movement of the axis may grant a perfect contact between the disc sliding surface 5B and a pad sliding surface 10, that will be better described later.

It should be noticed that, in order to allow the described movement of the axis A, the pads contact surface 7A and the stator contact surface 9 may be curved, more particularly, spherical; in particular, both may be spherical sectors. The pads contact surface 7A may be convex, while the stator contact surface 9 may be concave.

As shown in FIG. 3, the pads sliding surface 10 may be realized in a material that is different from the one used for the pad body 7B.

The pad sliding surface 10 is subject to a massive friction power density. Therefore, in order to improve pads wear life and to limit the frictional heating, it may be at least partially made of a low-frictional and wear resistant material. This material may comprise PolyCrystalline Diamond (PCD) or Diamond Like Carbon (DLC) film coating in form of a cladding, or other self-lubricating Carbon-based material such as Graphite or Carbon-Carbon Composite.

The pad body 7B may be made of WC+Co. The rotor 5 and the stator 6 may be made of high strength steel.

With reference to FIG. 3 it may be noticed that the stator disk comprises at least one housing 11 shaped to contain the pads 7 and configured to limit its movement in the direction of the rotating disc 5. A mechanical stop, which may be a shoulder, may be placed on the stator 6 to prevent the pads 7 from leaving the housing.

The housing may comprise a number of housings that is equal to the number of pads 7 located on it.

In order to allow the replacement of worn pads 7, each housing may have a removable closing 12 screwed (or fixed in another known manner) to the housing. Between the removable closing 12 and the pad 7 an elastic component is placed, to load the pad 7 in the direction of the rotating disc 5. The elastic component may comprise a plurality of springs 8 (that may be spring disks). A Pre-load of the springs 8 may be adjusted by rotating the removable closing (if screwed). Of course, other known pre load devices may be used.

Additionally, the removable closing device may include one or more shims 50, which may be arranged in a stack, interposed between the removable closing 12 and the housing 11 to precisely adjust the alignment of the protruding part of the pad 7. Shims 50 may also be used to compensate the general level of wear of pads.

This can allow adjusting of a pad sliding surface 10 and the disc sliding surface 5B, which can help in compensating the in-service wear of pads during maintenance operation.

To make the alignment of the loaded pad sliding surface 10 as precise as possible, a running-in operation may be carried out by polishing or burnishing.

As the pads 7 may be a replaceable parts, the pad contact surface 7A is in one embodiment made of a material that is less wear resistant with respect to the stator contact surface 9.

According to another aspect, an intermediate element 70A may be placed between the pad contact surface 7A and the stator contact surface 9. This intermediate element 70A may have a higher thermal conductivity with respect to the one of the pad body 7B. The intermediate element 70A may be a thin sheet or metallic foam made of high thermal conductivity material such as copper, gold or silver.

The intermediate element 70A may be simply located between the pad contact surface 7A and the stator contact surface 9. It may have a smooth surface to avoid scratching.

The removable closing 12, or at least the stator contact surface 9, may be formed of high strength steel or other good thermal conductor metal.

When in rest conditions, with magnetic bearings 15 perfectly working, the first assembly has the configuration shown in FIG. 3. No load is applied to the stator 6.

The springs 8 push the pads 7 against the shoulder, and there is no contact between the pads sliding surfaces 10 and the disc sliding surface 5B. A clearance A1 is therefore present between those parts. A clearance A2 is also present between the pad contact surface 7A and the stator contact surface 9.

Figure 4:
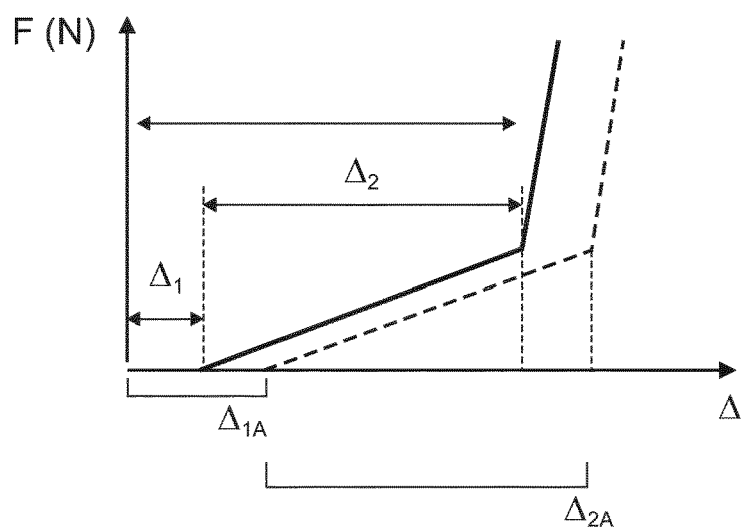
FIG. 4 shows a diagram used to measure a wear state of a landing system of the turbomachinery of FIG. 1.

When the magnetic bearings 15 become unable to support the shaft 4, the pad sliding surfaces 10 and the disc sliding surface 5B came into a sliding contact after a shaft axial displacement of Δ1 (see FIG. 4).

In this condition, the axis of the pad 7 may slightly start inclining to compensate the possible misalignment between the pad sliding surface 10 and the disc sliding surface 5B of the rotating disc 5. The inclination of the axis may also depend on the state of wear of the pad sliding surface 10.

While the shaft axial displacement is less than Δ1+Δ2, the elastic force of the springs 8 imposes contact between the pads 7 and the rotating disc 5, and there is no contact between the pad contact surfaces 7A and the stator contact surfaces 9.

Once the shaft axial displacement reaches Δ1+Δ2, the pad contact surfaces 7A transfers the axial force acting on the shaft to the contact surfaces 9, which, in this way, may stop the shaft 4 axial movement.

It should be noticed that, if the axis of the pad 7 is slightly inclined, the self-aligning properties deriving from the configuration of the pad-stator contact surface, may allow a smooth transfer of the load from the rotor to the stator (through the pads), thereby reducing the contact pressure.

When the magnetic bearings 15, 25 re-start to levitate the shaft, the force on the stator 6 is relieved and the shaft 4 may return in its original position, supported only by the magnetic bearings.

The described system may improve the maximum number of landings if compared to the conventional landing system.

For maintainability reasons, the described apparatus may have a wear monitoring and control system, based on the positioning function of the magnetic bearings 15 and 25.

The measure of wear may be derived from FIG. 4. This figure shows a continuous curve and a dashed curve.

The continuous curve (first curve) represents an axial displacement Δ of the shaft 4 correlated to a force F(N) transmitted by the shaft 4 to the stator 6, when the pads 7 are in an unworn state.

The dashed curve (second curve) represents an axial displacement Δ of the shaft 4 correlated to a force F(N) transmitted by the shaft 4 to the stator 6, when the pads 7 are in a worn state after some service.

Each curve shows two slopes, namely a low slope (due to the spring stiffness) and a high slope (due to an elastic deformation of the structural components and of the intermediate element 70A if present).

In both dashed and continuous curves, a first slope variation may be observed when the force F(N) grows from 0 to a value slightly higher than 0, at the points $\Delta_1$ and $\Delta_{1A}$.

In each curve, a second slope variation may be observed at the transition point $\Delta_1+\Delta_2$, $\Delta_{1A}+\Delta_{2A}$ between the low slope and the high slope.

The measure of wear may be performed by comparing the curve obtained with pads in worn state (dashed), with the curve obtained in unworn state (continuous). Reference to FIG. 3 (that represents a pad 7 in unworn state), may be made to understand what $\Delta_1$ and $\Delta_2$ represent on the pad. $\Delta_1$ is the clearance between the sliding surface 10 of the pad 7 and the disc sliding surface 5B. $\Delta_2$ is the clearance between the pad contact surface 7A and the stator contact surface 9 (taking in account the width of the intermediate element 70A if present).

The difference between $\Delta_{1A}$ and $\Delta_1$ is the 'signature' of the pads wear, stating that the shaft has started translation from a reference position.

Therefore the difference between $\Delta_{1A}$ (after service) and blank value $\Delta_1$ (new pads 7) gives the average wear of the pads.

From the plot of FIG. 4, the clearance $\Delta_1$, $\Delta_{1A}$ may not be clearly determinable (due to a slight shift between pad surfaces and low spring stiffness).

Therefore, to more precisely determine the wear of pads 7, the displacement $\Delta_1+\Delta_2$, $\Delta_{1A}+\Delta_{2A}$ present at the second slope variation may be used. In particular, the difference between the displacement $\Delta_{1A}+\Delta_{2A}$ measured at the second slope variation with worn pads 7 and the displacement $\Delta_1+\Delta_2$, measured at the second slope variation with unworn pads, gives a precise indication of pads wear state.

As described the method of measuring a wear state of pads 7 may comprise the steps of:

obtaining a first value $\Delta_1$, $\Delta_1+\Delta_2$ of a displacement linked to a slope variation of a first curve correlating an axial displacement Δ of the shaft 4 to a force transmitted by the shaft 4 to the stator 6 when the pads 7 are in unworn state and, obtaining a second value $\Delta_{1A}$, $\Delta_{1A}+\Delta_{2A}$ of the displacement linked to a slope variation of a second curve correlating an axial displacement Δ of the shaft 4 to a force transmitted by the shaft 4 to the stator 6 when the pads 7 are in a worn state and obtaining an indication of the wear state of the pads 7 by comparing the first curve with the second curve.

In detail, the indication of the wear state of the pads 7 may be the difference between the second value $\Delta_{1A}+\Delta_{2A}$ and the first value $\Delta_1+\Delta_2$, both obtained at a transition point between a low slope and a high slope.

The system above described may reduce the risk of fragile fracture of materials in sliding contact because of the presence of the springs, which may allow a softer contact between the stator and the rotating disc.

Moreover, the self-aligning properties of the pads may also prevent the materials used for the pads 7 and the stator 6 from fragile fracture.

It is also possible to easily monitor the total wear of the pads using the magnetic bearings embedded controls, which may accurately indicate the axial position of the shaft, as above described.

The system is also easy to assemble/disassemble for maintenance and for replacing the stator parts.

Furthermore, the described system grants an increased number of axial landings, leading to the extension of the life of compressors.

It should be noticed that the landing system above described, might be applied to other kind of turbomachinery, and for example, to an axial compressor or to a gas turbine.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

One or more embodiments of the disclosure may comprise one or more of the following clauses, alone or in combination.

In particular, an embodiment refers to an auxiliary turbomachinery shaft-support system 1 comprising:

a first assembly 3 configured to axially support the shaft 4 and comprising a rotating disc 5 and a stator 6, the rotating disc 5 having a part 5A configured to be torsionally coupled to the shaft 4 and a disc sliding surface 5B, the stator 6 comprising at least one pad 7, more particularly, at least two pads, at least one pad 7 being coupled with an elastic component 8 that urges the pad 7 in the direction of the disc sliding surface 5B.

According to one aspect, at least a pad 7 comprises a pad contact surface 7A cooperating with a stator contact surface 9, the pad contact surface 7A and the stator contact surface 9 being configured for self-aligning them.

According to a further aspect, the pad contact surface 7A and the stator contact surface 9 are at least partially spherical.

According to one aspect, the pad 7 comprises a sliding surface 10 faced toward the disc sliding surface 5B, the sliding surface 10 being at least partially made of a low-friction and wear-resistant material, and in one embodiment selected from the group consisting of: PolyCrystalline Diamond, Diamond Like Carbon, and self-lubricating Carbon-based material and combinations thereof.

According to a further aspect, the low-friction and wear-resistant material comprises PolyCrystalline Diamond in a matrix of cobalt.

According to another aspect, the stator 6 comprises at least one housing 11 configured to contain the pad 7, the housing 11 having a removable closing 12 fixed to it, and a mechanical stop designed to contact the pad 7 in order to prevent it from exiting the housing.

According to another aspect, the elastic component comprises a stack of disc springs 8.

According to another aspect, the pad body 7B is made of a material that is less wear resistant than the stator contact surface 9.

According to another aspect, the intermediate element 70A is interposed between the pad contact surface 7A and the stator contact surface 9, the intermediate element 70A being made of a material with an higher thermal conductivity than the pad body 7B, and in one embodiment selected from the group consisting of: copper, gold and silver and combinations thereof.

According to a further aspect, the second assembly 2 is configured to at least radially support the shaft, the second assembly comprising a ball bearing, more particularly, a conventional ball bearing.

According to again a further aspect, the pad sliding surface 10 has a circular, rectangular or sector-shape geometry.

Another embodiment refers to a turbomachinery comprising a rotor assembly 14 having a shaft 4 supported by at least an auxiliary turbomachinery shaft-support system 1 according to one or more of the preceding claims.

According to one aspect, the shaft 4 is supported by at least two radial magnetic bearing 15 and one thrust magnetic bearing 25.

An embodiment refers to a method to measure a wear state of pads 7 of the auxiliary turbomachinery shaft-support of one or more of claims 1-11, comprising the steps of:

obtaining a first value Δ1, Δ1+Δ2 of a displacement linked to a slope variation of a first curve correlating an axial displacement Δ of the shaft 4 to a force transmitted by the shaft 4 to the stator 6 when the pads 7 are in an unworn state and obtaining a second value Δ1A, Δ1A+Δ2A of the displacement linked to a slope variation of a second curve correlating an axial displacement Δ of the shaft 4 to a force transmitted by the shaft 4 to the stator 6 when the pads 7 are in a worn state and obtaining an indication of the wear state of the pads 7 by comparing the first curve with the second curve.

According to one aspect, the indication of the wear state of the pads 7 is the difference between the second value Δ1A+Δ2A and the first value Δ1+Δ2, both obtained at a transition point between a low slope and a high slope. While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An auxiliary turbomachinery shaft-support system comprising:

a first assembly configured to axially support the shaft and comprising a rotating disc and a stator, the rotating disc comprising a disc sliding surface and a part configured to be torsionally coupled to the shaft, and the stator comprising at least one pad comprising a pad body defining a pad contact surface configured to cooperate with a stator contact surface when they touch each other:

an elastic component coupled to the at least one pad to urge the at least one pad in the direction of the disc sliding surface, wherein the pad body made of a material that is less wear resistant than the stator contact surface.

2. The auxiliary turbomachinery shaft-support system of claim 1, wherein the pad contact surface and the stator contact surface are at least partially spherical.

3. The auxiliary turbomachinery shaft-support system of claim 1, wherein the at least one pad further comprises a sliding surface faced toward the disc sliding surface.

4. The auxiliary turbomachinery shaft-support system of claim 3, wherein the sliding surface is at partially made of PolyCrystalline Diamond in a matrix of cobalt.

5. The auxiliary turbomachinery shaft-support system of claim 3, wherein the sliding surface is at least partially made of PolyCrystalline Diamond, Diamond Like Carbon, a self-lubricating Carbon-based material or combinations thereof.

6. The auxiliary turbomachinery shaft-support system of claim 1, wherein the stator further comprises at least one housing having a removable closing configured to contain the at least one pad.

7. The auxiliary turbomachinery shaft-support system of claim 1, wherein the elastic component comprises a stack of disc springs.

8. The auxiliary turbomachinery shaft-support system of claim 1, further comprising a second assembly configured to at least radially support the shaft, the second assembly comprising a ball bearing.

9. The auxiliary turbomachinery shaft-support system of claim 1, wherein the pad sliding surface has a circular, rectangular or sector-shape geometry.

10. A turbomachine comprising a rotor assembly shaft that is supported by at least the auxiliary turbomachinery shaft-support system of claim 1.

11. The turbomachinery of claim 10, wherein the shaft is supported by at least two radial magnetic bearings and one thrust magnetic bearing.

12. The turbomachinery of claim 10, wherein the pad contact surface and the stator contact surface are self-aligning relative to each other.

13. The auxiliary turbomachinery shaft-support system of claim 1, wherein the stator comprises at least two pads.

14. The auxiliary turbomachinery shaft-support system of claim 1, wherein the pad contact surface and the stator contact surface are self-aligning relative to each other.

15. An auxiliary turbomachinery shaft-support system comprising:
   a first assembly configured to axially support the shaft and comprising a rotating disc and a stator, the rotating disc comprising a disc sliding surface and a part configured to be torsionally coupled to the shaft, and the stator comprising at least one pad comprising a pad body defining a pad contact surface configured to cooperate with a stator contact surface when they touch each other:
   an elastic component coupled to the at least one pad to urge the at least one pad in the direction of the disc sliding surface; and
   an intermediate element interposed between the pad contact surface and the stator contact surface, the intermediate element being made of a material with a higher thermal conductivity than the pad body.

16. The auxiliary turbomachinery shaft-support system of claim 15, wherein the intermediate element is made of copper, gold silver or combinations thereof.

17. A turbomachine comprising a rotor assembly shaft that is supported by at least the auxiliary turbomachinery shaft-support system of claim 15.

* * * * *